(12) United States Patent
Schwagmann et al.

(10) Patent No.: US 12,430,082 B2
(45) Date of Patent: Sep. 30, 2025

(54) CONNECTION ELEMENT FOR PRODUCING A WIRED CONNECTION BETWEEN A FIRST AND SECOND UNIT

(71) Applicant: TURCK Holding GmbH, Halver (DE)

(72) Inventors: Hermann Schwagmann, Detmold (DE); Thomas Kriegel, Lüdenscheid (DE); Dirk Mantei, Detmold (DE)

(73) Assignee: TURCK Holding GmbH, Halver (DE)

( * ) Notice: Subject to any disclaimer, the term of this patent is extended or adjusted under 35 U.S.C. 154(b) by 473 days.

(21) Appl. No.: 17/933,656

(22) Filed: Sep. 20, 2022

(65) Prior Publication Data

US 2023/0101533 A1 Mar. 30, 2023

(30) Foreign Application Priority Data

Sep. 27, 2021 (DE) .......................... 102021124886.8

(51) Int. Cl.
*G06F 3/08* (2006.01)
*G06F 13/40* (2006.01)

(52) U.S. Cl.
CPC ............ *G06F 3/08* (2013.01); *G06F 13/4068* (2013.01); *G06F 2213/3814* (2013.01)

(58) Field of Classification Search
CPC . G06F 3/08; G06F 13/4068; G06F 2213/3814
See application file for complete search history.

(56) References Cited

U.S. PATENT DOCUMENTS

| | | | |
|---|---|---|---|
| 2016/0098369 A1* | 4/2016 | Berkobin | G06F 13/4068 710/106 |
| 2016/0357178 A1 | 12/2016 | Burger-Scheidlin et al. | |
| 2017/0162929 A1 | 6/2017 | Goren | |
| 2021/0278911 A1* | 9/2021 | Lu | G06F 3/0383 |

FOREIGN PATENT DOCUMENTS

| | | |
|---|---|---|
| DE | 10 2011 089 346 A1 | 6/2013 |
| DE | 102012112687 A1 | 6/2014 |
| EP | 2 220 564 B1 | 9/2015 |
| EP | 3 086 232 A2 | 10/2016 |
| EP | 3005248 B1 | 1/2020 |

OTHER PUBLICATIONS

European Patent Office report in EP Appl. No. 22191474 mailed Feb. 16, 2023, 2 pages.
Office Action in European Appl. No. 22 191 474.0 mailed May 16, 2025, 8 pages.

* cited by examiner

*Primary Examiner* — Minh Q Phan
(74) *Attorney, Agent, or Firm* — Kowert, Hood, Munyon, Rankin & Goetzel, P.C.; Gentry C. McLean; Dean M. Munyon

(57) ABSTRACT

The disclosed embodiments relate to a system including a connection element for producing a wired connection between a first unit and a second unit, the connection element comprising a diagnostic module; wherein the diagnostic module comprises: a receiving interface, which is set up to receive data from the first unit over a wired data connection, a memory module, which is set up to store the data received from the first unit, and a read-out interface, which is set up to output the data stored by the memory module over a wireless data connection. The disclosed embodiments furthermore relate to a system including the first unit with the connection element directly connected to the first unit, as well as a system with the first unit and the second unit. The disclosed embodiments finally also relate to a method for producing a wired connection.

20 Claims, 2 Drawing Sheets

CONNECTION ELEMENT FOR PRODUCING A WIRED CONNECTION BETWEEN A FIRST AND SECOND UNIT

CROSS-REFERENCE TO RELATED APPLICATIONS

The present application claims priority under 35 U.S.C. § 119 to German patent application 10 2021 124 886.8, filed Sep. 27, 2021, the disclosure of which is incorporated by reference herein in its entirety.

TECHNICAL FIELD

This disclosure relates to a connection element for producing a wired connection between a first and a second unit. It furthermore relates to a unit and a system with a connection element as well as a method.

DESCRIPTION OF RELATED ART

Configuration data stored in field devices are advantageously transferred to the new device when a field device is replaced. For this, a method for operating a field device of process automation technology, in order to provide the basic function of the field device even if the power supply to the field device, for example via the fieldbus, has failed, is described in DE 10 2011 089 346 A1.

In the case of a total failure of the field device, on the other hand, it can be time-consuming to then look for the error which has led to the failure of the field device. This can be, for instance, environmental influences, such as vibration, fire, pressure or the like, or also operating errors, such as for example an interruption of an update.

Microcontroller-based electronic circuits, such as are used in field devices, for instance in a fieldbus station with communication interfaces and in-/outputs or a sensor unit or in infrastructure components such as switches, are exposed to many damaging environmental conditions and/or can be destroyed by incorrect use. These electronic circuits are protected by suitable measures against such environmental and use conditions. These include mechanical and design solutions, such as housing, seals, potting, coatings and plastic casings, which surround these circuits and protect them against mechanical influences such as shocks or vibrations as well as prevent an ingress of water or other harmful substances.

Further, technical solutions are used which are intended to prevent, for example, destructive voltage spikes, overloading, overheating, incorrect use or use within particular limits. All loads which can arise beyond that destroy the electronic circuit or its components for the short or long term. These are usually made known to the user of the device with the aid of operating instructions and information on standards, in order to ensure that these electronic circuits are not used outside the named maximum loads or other incorrect use leads to destruction. An incorrect use could be, for example, an ambient temperature that is too high, operation underwater, a current or voltage load or vibration load that is too high. A further error source is an interruption of the power supply during critical operating states of a device, which at that moment is undergoing a software update for example.

In spite of all protective measures, advice and restrictions of the operation, in some circumstances a destruction of electronic circuits and devices will occur. After the destruction of these circuits or devices, they are in case of doubt no longer operational.

A data recovery method by means of a cable assembly with storage function is known from EP 3 086 232 A2. Here, it is provided that in response to a backup signal a data backup is performed for an electronic device on a flash memory module of the cable assembly. In response to a recovery signal data are transmitted from the flash memory module of the cable assembly to the electronic device.

A USB cable for providing electrical power from a power source to a mobile electronic device is known from EP 2 220 564 B1. The cable has a memory module. Data of a mobile device can be backed up. Moreover, a recovery of the data on the mobile device or a transfer to another mobile device can be performed.

A charging cable for electronic devices is known from US 2017/0162929 A1. The charging cable comprises a module with an antenna for wireless communication with one or more electronic devices. A data backup of a coupled device is carried out and stored on the module of the charging cable.

SUMMARY OF DISCLOSED EMBODIMENTS

An object of the disclosed embodiments was to make troubleshooting possible in a simpler manner even in the case of a total failure of a unit.

This object is achieved by a connection element and a method of the type named at the beginning with the features of the independent claims. Advantageous designs and developments of the disclosed embodiments are specified in the dependent claims.

The connection element for producing a wired connection between a first unit and a second unit comprises a diagnostic module. The diagnostic module in turn comprises a receiving interface, which is set up to receive data from the first unit via a wired data connection, a memory module, which is set up to store the data received from the first unit, and a read-out interface, which is set up to output the data stored by the memory module over a wireless data connection.

A basic concept of the disclosed embodiments is that data provided by the first unit are stored in a memory module of the connection element and can be read out wirelessly from there via the read-out interface.

Furthermore, a basic idea of the disclosed embodiments is to store relevant data relating to the first unit in spatial proximity and directly assigned to the first unit and to have them available so that they are particularly easy to read out, in particular in the case of a possible failure of the first unit.

Furthermore, it can thus be achieved that the backed-up data relating to the first unit are stored in spatial proximity and in a location which can be very easily and uniquely assigned. The connection element is connected to the first unit and can therefore—above all in a larger system with many components—be located particularly easily and intuitively; as a result, the diagnostic module can also be found and read out easily.

Furthermore, outage times can be reduced, in particular when it is necessary to change a device in the system.

The disclosed embodiments furthermore make it possible to use the diagnostic module with different units, which do not necessarily have to be modified for this purpose; this saves costs compared with other systems and methods which require highly specialized hardware.

Moreover, problems during operation of the first unit as well as adverse effects or even damage arising as a result can be identified with reference to the stored data and solved particularly easily. Thus, failures can be reduced and the possible service life of devices can be extended.

Security-relevant problems can possibly also be identified and solved in good time.

In particular, the diagnostic module can be set up such that the data can also be output or read out when there is no data connection between the first and second units and/or no data connection between the diagnostic module and the first unit.

Furthermore, the diagnostic module can be set up such that the data can also be output or read out when the diagnostic module is not supplied with electrical power by the first or second unit, in particular also when the diagnostic module does not have its own energy storage. In particular, the data are then passively read out by an external unit, for instance a read-out device, which provides the power required by the diagnostic module during a read-out procedure, for instance inductively, such as for example in the case of RFID tags.

In a first design, the connection element is set up to produce a data connection and/or a connection for the transmission of electrical power between the first unit and the second unit.

In particular, it is provided that the connection element produces a point-to-point connection between the first and second units.

Here, the connection element is formed such that it is suitable for producing the wired connection between the first and the second unit. For this, the connection element can for example comprise a cable and/or an electrical plug-in connector.

The wired connection between the first and the second unit is for example formed as a data connection and/or allows a transmission of electrical power, for instance for charging a battery in the case of a charging cable, for operating an actuator or sensor or for providing an operating voltage for another unit, for example an arithmetic unit. The wired connection can also be effected such that both data and electrical power can be transmitted in a manner known per se.

For example, an IO-Link connection between the first and second units can be produced via the connection element.

In particular, it is not a USB connection.

The first unit can be formed in various ways, in particular as an electrical unit. This electrical unit can for example be a field device or comprise one.

A field device can for instance be a fieldbus station with communication interfaces and in-/outputs, a sensor unit or an infrastructure component such as a switch. A field device can furthermore be formed such that it is directly related to a production process, for instance a production system. Examples thereof are for instance I/O modules, modular I/O stations and controllers (PLCs). The field device can in particular be formed as an actuator and/or sensor or comprise one.

The first unit can furthermore comprise a telecommunications unit. In a further design, it can be provided, however, that the first unit is precisely not a mobile telephone or another telecommunications device.

The second unit can also be formed in various ways, which are known per se. It can for instance comprise an IO-Link master unit, a switch or a voltage supply, for instance with a charging device or a device for providing an operating voltage.

The receiving interface of the diagnostic module is formed to receive data from the first unit over a wired data connection. This data connection can also be produced or operated in a manner known per se—in a similar manner to a data connection between the first and the second unit which can optionally be produced via the connection element. For example, a wired connection between the receiving interface of the diagnostic module of the connection element and a corresponding interface of the first unit can be producible via the connection element.

The receiving interface of the first unit can for instance comprise an electronic, in particular a microelectronic circuit.

In order to implement the wired data transmission, in particular over a wired data connection, between the first unit and the receiving interface of the diagnostic module, various technologies and protocols can be utilized. For example, Single Pair Ethernet (SPE) or Advanced Physical Layer (APL), ethernet-based fieldbus protocols, such as e.g. PROFINET, EtherNet/IP, Modbus, IO-Link, Powerline Communication (PLC)/Powerline/PowerLAN in particular according to IEEE-1901-FFT or IEEE-1901-wavelet or ITU G.hn, or USB can be utilized. Combinations of various protocols can also be provided depending on the context of use.

In a design of the disclosed embodiments, the connection element is not suitable for a connection via USB.

It can be provided that an encrypted data connection can be produced for the reception of data from the first unit by the receiving interface of the diagnostic module, in order to enable a particularly advantageous level of security.

The diagnostic module can also be supplied with electrical power in various ways known per se. If data and power are transmitted via the connection element, for instance an electrical cable, then the diagnostic module can also be supplied from the power-transmitting wires of the cable. This can be the case, for example, in the following technologies/protocols: Power over Data Lines (PoDL), Power over Ethernet (PoE), IO-Link, Powerline Communication (PLC)/Powerline/PowerLAN in particular according to IEEE-1901-FFT or IEEE-1901-wavelet or ITU G.hn, and USB.

Furthermore, the diagnostic module can be supplied with power via a separate supply line.

Furthermore, the diagnostic module can be supplied with electrical power with the aid of a battery, a storage battery or a supercapacitor.

Furthermore, a power supply can also be effected contactlessly, for instance through an RFID/NFC functionality of the diagnostic module.

The diagnostic module comprised by the connection element can furthermore comprise a data processing module. This provides in particular the necessary control functionalities in order to operate the receiving interface and the read-out interface as well as the memory module.

Furthermore, by means of the data processing module, a data processing of the received data from the first unit can be effected, for instance a filtering, a compression and/or decompression, a conversion to a particular data format or another data processing, for example a determination of an error code with reference to a lookup table.

The received data can be received over an encrypted connection between the first unit and the diagnostic module.

Furthermore, in the diagnostic module an encryption of the data to be stored or to be output can be effected by means of the data processing module, in order to prevent the unauthorized access to the data.

The read-out interface can also be formed in various ways. It is crucial that it allows a wireless output of data which are stored on the memory module. The read-out interface is optionally set up such that the data stored on the memory module or a subset thereof can be provided during a read-out procedure.

The output can for instance be effected actively, wherein the diagnostic module actively sends the data in question, for instance to a read-out device which is set up to read out the data. The data in question can for instance be output by the diagnostic module in response to a read-out or request signal. Thus, for example, a read-out device can be set up to transmit a read-out or request signal to the diagnostic module and to receive the data then output during a read-out procedure.

The data in question can furthermore be output passively by the diagnostic module, for instance if the diagnostic module does not have its own power supply, if such a power supply is not working or if, for other reasons, the data cannot be provided actively: in the case of the passive output, in particular, a read-out device is used which controls the read-out procedure without the diagnostic module having its own power supply or without independent operation of the diagnostic module, for instance by means of near-field communication; the diagnostic module and in particular the read-out interface can also be provided from outside with a power that is necessary for operation, such as for instance when an RFID/NFC tag is read out.

For example, the memory module can be connected to a tag or integrated in one, in particular in an RFID/NFC tag. Such an interface for wireless data transmission can be formed unidirectional and for instance allow a wireless output of the data stored in the diagnostic module, or it can allow bidirectional communication, for instance for configuring the output procedure or for writing to the memory module.

In the case of a bidirectional communication between the diagnostic module and an external unit for outputting the data of the diagnostic module, a request signal can for instance be transmitted to the diagnostic module, wherein the diagnostic module then provides data depending on the request signal. With reference to such a request signal, the diagnostic module can for example determine whether an external unit is authorized to access the data and/or which of the items of stored data are to be provided.

The memory module can also be formed in different ways. It is suitable for storing the relevant data, which have been received from the first unit and optionally processed by a data processing module, and for keeping them ready to be output. A non-volatile data memory is in particular provided, with the result that the stored data are retained even if other components fail and in particular if the voltage supply of the diagnostic module fails.

In a further design, the data received from the first unit comprise operating data and/or diagnostic data.

Operating data can for example comprise parameters in connection with the operation of the first unit, for instance a configuration of the device, formulas, use information, operating hours or a number of individual uses, maintenance information and others.

Diagnostic data comprise in particular those parameters which are relevant for the determination of a probability of failure or damage, for instance the number of overvoltages determined during operation, measured ambient values such as temperature, humidity or pressure. Status information, for instance "I am located in the update function of the operating software", "ambient temperature too high" or "voltage spike detected", also come into consideration as operating or diagnostic data.

In particular, the diagnostic data can be taken to mean a subset of the operating data.

The diagnostic data can furthermore comprise failure information or be formed from this. Failure information in this sense can be those items of information and data which are acquired in connection with a failure or a malfunction of the first unit, for instance in a temporal context before a failure or before and/or during a malfunction.

The memory module can be operated as a ring buffer, in which a particular quantity of data is stored and, when a particular storage volume is reached, the oldest data are overwritten after a time interval or after a defined event has occurred. Thus, current data can always be provided right up until a defined past. As a result, after a failure of the first unit, in which the provision of the data to the diagnostic module is also stopped, the operating data for a defined time interval before the failure can be provided. This makes it easier to diagnose and identify a problem.

The data received and stored in the memory module can for instance include: a data transmission rate or a volume of data transmitted over a data connection, a processing power, a speed or acceleration, a force, electrical parameters such as voltage, current and resistance, an electric or magnetic field strength, a temperature, a humidity value, an acceleration and/or a pressure.

A threshold value can be defined for a parameter and the value of the parameter is only transmitted to the diagnostic module or only stored by the latter when the value is above or below the threshold value. For example, it can thus be documented that a parameter reaches a critical range in which for instance an increased probability of failure arises or safe operation of the first unit is not possible. Diagnostic data can then be suitable for ascertaining a cause or a probable cause of a failure or a malfunction of the first unit.

The read-out interface which is formed as a wireless interface and via which the data from the memory module can be read out is preferably formed as a separate component and connected to the memory module. This makes it possible to also read out the data in the memory module when the first unit can no longer be addressed. The read-out interface via which the data from the memory module can be read out is particularly preferably formed integrally with the memory module.

By supplementing a first unit with a memory module which is connected thereto and which can preferably also be addressed as a passive NFC tag, the data which have been stored on the memory module during operation can be read out irrespective of the status of the remaining components. Through evaluation it can be determined what has led to the (total) failure of the first unit, for instance a field device. Items of information which have been stored on this memory module can thus be read out "post mortem". It is thus possible to obtain items of information via a circuit (or a device) which is otherwise no longer operational, also for example via an RFID reader brought close from outside.

Memory modules can often also be removed from a destroyed circuit and used or addressed in functioning electronic circuits or systems. The useful items of information are thereby available again. However, this is more complex than reading out the data via the wireless interface, in particular when the modules are for example potted or coated or are otherwise not easily accessible or cannot be removed non-destructively—possibly only by heat treatment or chemical release. Electronic circuits and devices can thus be analyzed "post mortem" in spite of it no longer being possible to put them into operation. Knowledge from this can be used as evidence of mishandling and can avoid warranty or compensation claims or provide useful items of information about the status of the device, in order to simplify bug fixing in one type of device.

In a design, the memory module is set up in order to be addressable as a passive RFID tag. In particular a memory module which is connected to the microcontroller and is also addressable as a passive RFID tag is thus added to a microcontroller-based electronic circuit. It is likewise possible to use an RFID tag or an NFC tag. A combination of several tags is preferably utilized in order to increase the redundancy. These can be several identically constructed tags or several tags of different types and/or technologies, i.e. RFID tag, UHF RFID tag, HF RFID tag or NFC tag in combination, or tags with different storage capacities in combination. This also makes it possible to store different contents on the different memories of the individual tags and thus retrieve them again via different tags and the wireless interfaces thereof.

Via this RFID tag items of information can be read out via the wireless interface even before a failure of the first unit and it is preferably also possible to write items of information to the memory module of the diagnostic module via the wireless interface. Thus, for example, maintenance or inspection data can be stored on the memory module or older data can also be deleted.

Tags are preferably used which have an interface to the microcontroller in addition to the wireless interface. The RFID tag with the memory module is therefore the data medium for the logged data.

An electrical unit is furthermore preferably provided, in which the memory module has a transponder, preferably according to the NFC and/or the RFID standard.

Near-Field Communication (abbreviated to NFC) is an international transmission standard based on RFID technology for the contactless exchange of data via electromagnetic induction by means of loose coupled coils over short distances of a few centimeters and with a data transmission rate of at most 424 kbit/s.

RFID (radio-frequency identification) denotes a technology for transceiver systems for the automatic and contactless identification and location of objects and living beings using radio waves.

An RFID system as a rule consists of a transponder (colloquially also called radio tag), which is located on or in the object, here thus preferably the memory module, and contains an identifying code, as well as a reader for reading out this identifier. In such a read-out procedure, the identifier is output by the transponder of the RFID system and received by the reader.

It is possible to produce RFID transponders via a special method for printing stable circuits from polymers.

The coupling preferably takes place through alternating magnetic fields generated by the reader in a low range or through high-frequency radio waves. Thus, not only are data preferably transmitted, but the transponder is also supplied with power.

The read-out device preferably contains a piece of software (a microprogram) which controls the actual read-out process and particularly preferably also a piece of RFID middleware with interfaces to further EDP systems and databases.

A connection element is furthermore preferably provided, in which the memory module and/or the microcontroller is/are not technically accessibly installed. As a result, the modules can be protected from environmental influences and damage.

The diagnostic module can be integrally cast into a housing such that it is shut off from the environment in a water-tight manner. Such a housing can enclose the diagnostic module.

In a development, the data received from the first unit comprise configuration data for the first unit.

The configuration data can be stored in the received form. They can furthermore optionally be processed by means of a data processing module, for instance in order to compress or encrypt them.

The connection element can be set up to transmit the configuration data to the first unit or a first replacement device in response to a recovery signal. For example, a resetting or a recovery of a system status after a malfunction can thus be achieved. Furthermore, a rapid configuration of a replacement device can be implemented by transmitting a configuration of the initially connected first unit to it. The diagnostic module can accordingly be formed as a "diagnostic and backup module".

In a design, the connection element comprises an electrical plug-in connector.

For example, the connection element can comprise a cable with two plug-in connectors. By means of these plug-in connectors the connection between the first and the second unit can be producible.

An electrical plug-in connector can be formed in various ways and is not limited to connectors which can be connected purely by plugging them in. Rather, other connectors can also be included in which input-side contacts can be at least partially connected to a complementary plug through a plug-in procedure. Such a plug-in connector is for instance suitable for connecting cables and further devices. To that end it is preferably provided with input- and output-side contacts.

In a further design, the diagnostic module is comprised by the electrical plug-in connector. It can for example be integrated in the plug-in connector, for instance in a housing of the plug-in connector.

The diagnostic module can preferably be located in a plug-in connector which is connected to the first unit by which the data to be stored are provided. Furthermore, the diagnostic module can be located in a plug-in connector of the other end of the cable, on the side of the second unit.

Furthermore, it can be provided that the diagnostic module is arranged between the ends of the cable or, respectively, the plug-in connectors arranged there.

The diagnostic module of the connection element, thus for example integrated with a cable or a plug-in connector, can replace other units which are equipped with a similar diagnostic functionality and integrated in the first or second unit or otherwise externally arranged.

In a development, the diagnostic module furthermore comprises a sensor, through which connection operating data of the connection element can be acquired.

The diagnostic module can in this case be set up to acquire, by means of the sensor, receive and store or provide, via the read-out interface, data which relate to the second unit and/or the connection between the first and second units. In particular, the data can relate to a connection quality for the connection element, for instance a rate or volume of a data transmission, a transmitted electrical power or other parameters during operation of the connection between the first and the second unit. Further parameters, the value of which can be acquirable by means of the sensor, are for instance voltage, current and/or resistance, electric or magnetic field strength as well as temperature, humidity or pressure in the surroundings of the connection element or in the connection element itself. An overheating or overloading of the connection element can for instance be detected thereby.

The unit of the disclosed embodiments comprises a connection element according to the present description, wherein the connection element is directly connected to the unit.

It can be, for example, an electronic unit or an electrical unit with an electronic control unit. In particular, a field device, an actuator or a sensor can be provided. In the case of a direct connection between the unit and the connection element, a detachable intermediate element, i.e. an extension cable or the like, is in particular not provided.

The connection element can be permanently connected to the unit. In such a case, a plug-in connector is in particular not provided, in order to connect the connection element to the unit.

The system of the disclosed embodiments comprises a first unit and a second unit. Here, the first and the second unit are connected by means of a connection element according to the present description.

In the method for producing a wired connection between a first unit and a second unit by means of a connection element with a diagnostic module, the diagnostic module receives data from the first unit over a wired data connection. It stores the data received from the first unit and keeps the stored data ready so that they can be read out over a wireless data connection.

The method is in particular formed to operate the connection element, or a unit and a system with the connection element. It therefore has the same advantages as the connection element according to the present description.

In a further method for outputting device parameters of a connection element according to the present description, for the run time of the first unit data have been stored in the memory module and the first unit then has a fault, in the case of which the first unit cannot communicate over wired routes. In particular, in this state the first unit is not connected to a voltage supply. A step is now performed in which the data from the memory module are read out via the read-out interface of the connection element.

In a development of the method, the data from the memory module are output wirelessly via the read-out interface, in particular by means of RFID or NFC.

In a further design, moreover, the read-out data are output or displayed on a mobile end device.

Moreover, in a development of the method, the read-out data can be interpreted with reference to a predefined evaluation assignment in a further step. This can be effected, for example, in a mobile device which previously effected the reading out; the evaluation can, however, also be carried out by a further unit. In particular, a parameter is evaluated or output which has led to an increase in a probability of failure prior to the fault of the first unit.

BRIEF DESCRIPTION OF THE DRAWINGS

The disclosed embodiments are explained in more detail below with reference to the attached drawings. There are shown in.

DETAILED DESCRIPTION

Figure 1:
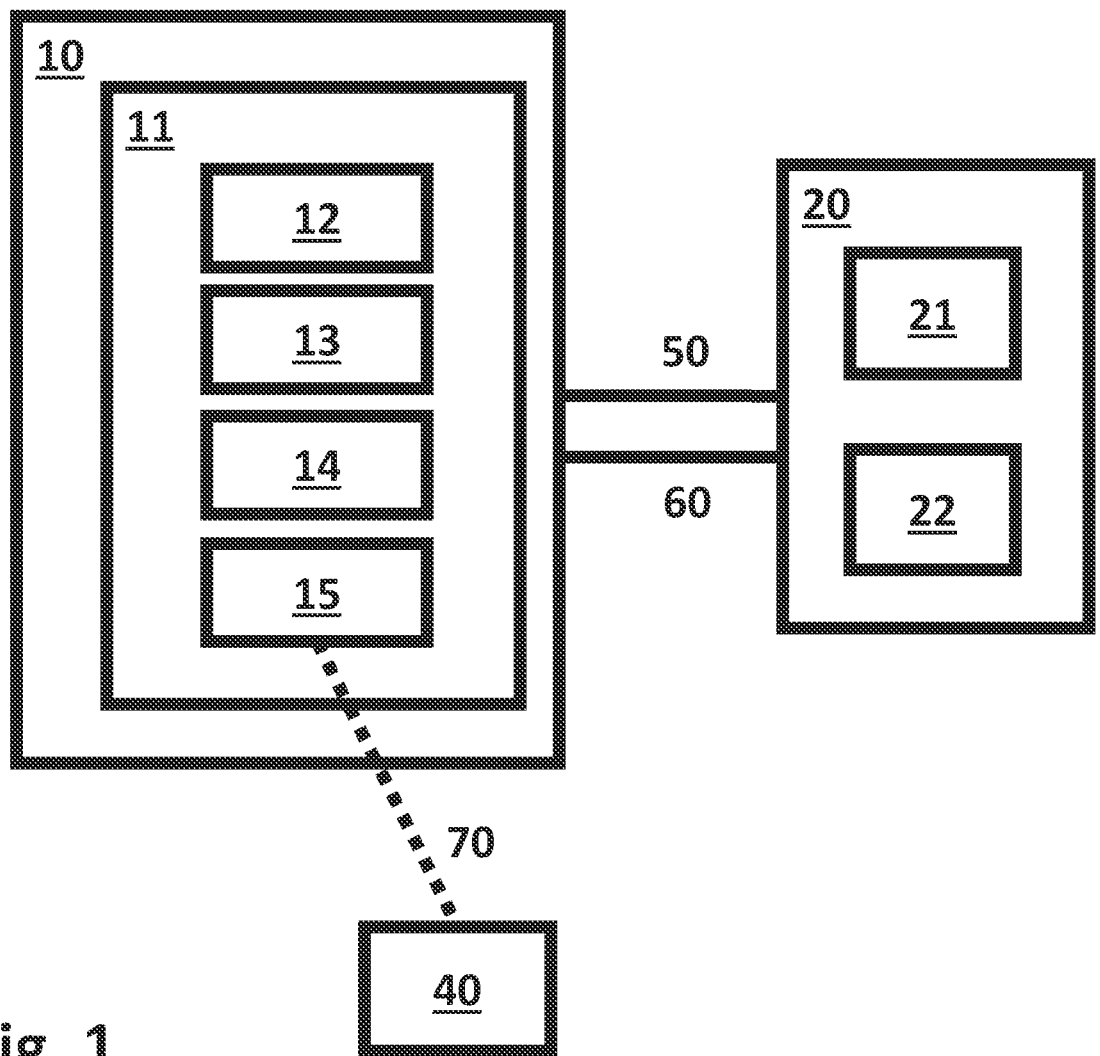
FIG. 1 is a block diagram illustrating a first example embodiment of a unit with the connection element disclosed herein.

A first embodiment example of a unit with the connection element is explained with reference to FIG. 1.

A first unit 20 comprises an electronic control unit 21.

The first unit 20 furthermore comprises a memory module 22.

In this example, the memory module 22 of the first unit 20 is set up to store, among other things, configuration data for the first unit 20.

Electrically conductive cables 50, 60, namely data lines 50 and power supply lines 60, are connected to the first unit 20.

In the embodiment example, these cables 50, 60 are permanently connected to the first unit 20. In further embodiment examples, it can be provided that one or more of the cables 50, 60 are detachably connected to the first unit 20, for instance by means of a plug-in connector.

A plug-in connector 10 is arranged at the end of the lines 50, 60 facing away from the first unit 20. This is formed in a manner known per se such that it can be connected to a complementary plug-in connector of a second unit (not represented); in this way, an electrical connection for power transmission by means of the power supply lines 60 or a data connection by means of the data lines 50 can be produced.

The plug-in connector 10 comprises a diagnostic module 11.

In various further embodiment examples, plug-in connectors can in each case be arranged at both ends of the lines 50, 60; in this case, the diagnostic module 11 can be integrated in one of these plug-in connectors.

The diagnostic module 11 comprises a receiving interface 12, a data processing module 13, a memory module 14 and a read-out interface 15.

The receiving interface 12 is formed such that over a wired data connection, in particular by means of a data line 50, to the first unit 20 can be produced.

The read-out interface 15 is formed such that a wireless connection 70 to an external read-out device 40 can be produced. The external read-out device 40 can be formed, for example, as a mobile end device, for instance as a mobile telephone or portable computer.

In the example, the wireless connection 70 is formed in a manner known per se as a near-field communication connection, for instance by means of RFID or NFC.

In the example, the connection 70 is moreover suitable for allowing a transmission of data, in particular from the read-out interface 15 to the read-out device 40.

Furthermore, in the example, it is possible to supply the diagnostic module 11 with electrical power from outside through the read-out device 40, in particular inductively through an alternating electric and/or magnetic field. This can make it possible to output data passively, in the case of which it is not necessary for the diagnostic module 11 to have its own power supply.

A second embodiment example of a unit with the connection element is explained with reference to FIG. 2. The structures of the first unit 120, the diagnostic module 111 and the external read-out device 140 are similar to the corresponding units 20, 11, 40 of the embodiment example explained above with reference to FIG. 1. The following explanations are therefore kept short.

In the example, the first unit 120 comprises an electronic control unit 121 and a memory module 122. Analogously thereto, the second unit 130 likewise comprises an electronic control unit 131 and a memory module 132.

In the embodiment example shown here, the connection element 110 comprises lines 150, 160 for producing a connection between the first 120 and second 130 units for transmitting data and electrical power. It furthermore comprises a diagnostic module 111.

In this embodiment example, the connection element 110 connects the first 120 and second 130 units directly in a point-to-point connection.

The connection between the connection element 110 and the first 120 or, respectively, second 130 unit is produced in a manner known per se, for instance by means of plug-in connectors at the ends of the lines 150, 160.

Figure 2:
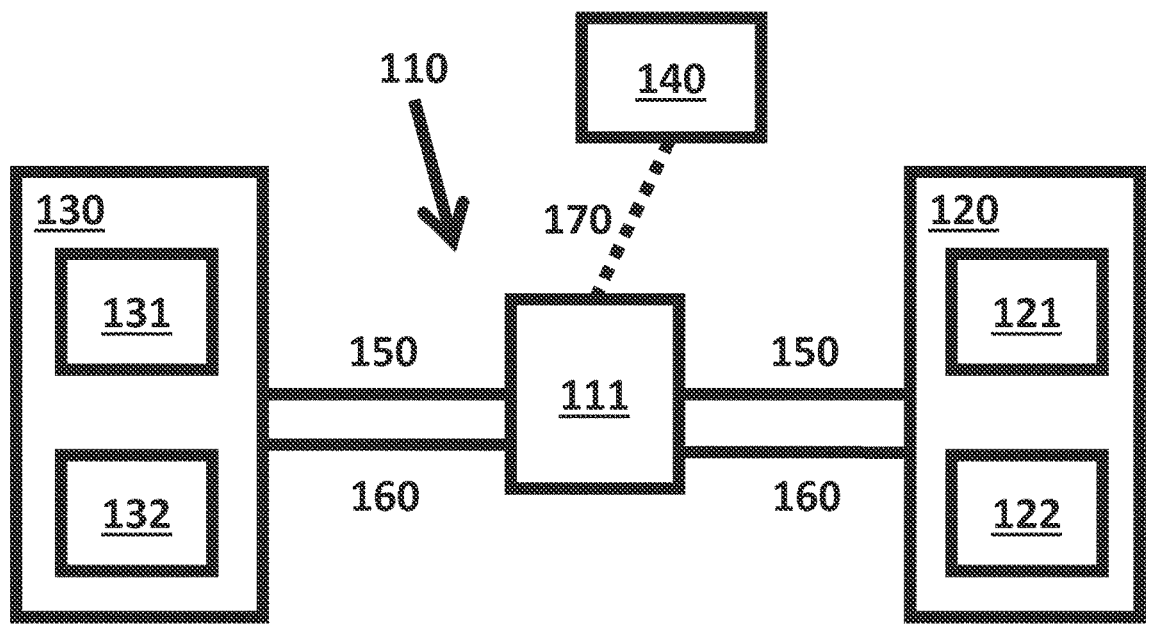
FIG. 2 is a block diagram illustrating a second example embodiment of a unit with the connection element disclosed herein.

Unlike the first embodiment example, as is shown in FIG. 1, in the second embodiment example the diagnostic module 111 is not integrated in a plug-in connector at one end of the lines 150, 160 of the connection element 110, but rather is arranged as an intermediate unit on at least one of the lines 150, 160.

Here too, analogously to the first embodiment example explained above, the diagnostic module 111 comprises a receiving interface, a data processing module, a memory module and a read-out module (not shown).

A wireless data connection 170 can be produced from the diagnostic module 111 to an external read-out device 140. This connection can be produced in particular by means of a near-field communication technology, for instance RFID/NFC.

Figure 3:
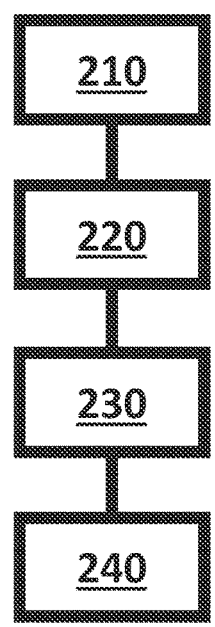
FIG. 3 is a flow diagram illustrating an example embodiment of the method for producing a wired connection between a first unit and a second unit.

An embodiment example of the method for producing a wired connection between a first unit and a second unit is explained with reference to FIG. 3. The embodiment examples explained above with reference to FIGS. 1 and 2 are to be taken as the starting point. The reference numbers of FIGS. 1 and 2 are therefore indicated for corresponding elements and modules.

In a first step 210, the diagnostic module 11, 111 receives data from the first unit 20, 120. The data connection necessary for this is wired and is produced via the data line 50, 150. Furthermore, in the embodiment example, the diagnostic module 11, 111 is supplied with an operating voltage via the power supply line 60, 160.

In step 210, the data are received via the receiving interface 12 of the diagnostic module 11, 111 and processed by means of the data processing module 13 in a further, optional step 220.

Depending on the context of the operation of the connection element 10, 110, the received data are filtered, converted, compressed and/or decrypted or encrypted during the data processing.

The data are—optionally after the data processing in step 220—stored and kept available in a step 230 by the memory module 14.

In the storage procedure, the data can also be encrypted.

In a further step 240, the stored data can be read out via the read-out interface 15, in particular over a wireless data connection. For example, a data transmission by means of RFID or NFC can be effected for this.

The external read-out device 40, 140 is for example utilized for reading out data via the read-out interface 15. A data connection is produced between the read-out interface 15 of the diagnostic module 11, 111 and the data are transmitted.

The read-out procedure can for example be controlled only by the read-out device 40, 140. This can furthermore transmit the power required by the diagnostic module 11, 111 to output the data wirelessly, for instance inductively, as is known for example in the case of RFID tags.

Furthermore, the read-out procedure can be effected such that the diagnostic module 11, 111 provides particular data actively in response to a read-out signal and sends them, for example, via an antenna of the read-out interface 15. The provided data can be formed and for example filtered depending on the read-out signal.

The data can then be received by the read-out device 40, 140 and evaluated and/or output.

In a further embodiment example, the data are transmitted encrypted and decrypted in the read-out device 40, 140.

In a further embodiment example, an evaluation of the data acquired by the diagnostic module 11, 111 is performed in the read-out device 40 in a subsequent step. In particular, a cause of a failure of or damage to the first unit 20, 120 is determined. For example, a value of a parameter, which is comprised by the transmitted data, is compared with a threshold value, and if it is above or below it an advice regarding the parameter, or the value of the parameter, is output.

In a further embodiment example of the method, for the run time of the first unit 20, 120 data are stored in the memory module 14 of the diagnostic module 11, 111. If the first unit 20, 120 later has a fault, in the case of which it can no longer communicate over wired routes and its voltage supply is interrupted, the data can then be read out from the memory module 14.

In a further embodiment example, it is furthermore provided that the diagnostic module 11, 111 is formed as a "diagnostic and backup module". For the run time of the first unit 20, 120, the diagnostic module 11, 111 acquires configuration data and stores them on the memory module 14. After a failure of the first unit 20, 120 or if the latter is replaced for another reason, the stored diagnostic data can then be utilized for the rapid recovery.

In a corresponding method, configuration data of the first unit 20, 120 are received and stored by the diagnostic module 11, 111. In response to a recovery signal, the stored configuration data are then transmitted back to the first unit 20, 120 again or another unit connected as a replacement. The transmission and retransmission can be effected wired, for instance over the same data connection over which the further data are also transmitted, for instance operating and diagnostic data. Other connections can also be utilized, for instance a parallel wired connection or a wireless connection.

LIST OF REFERENCE NUMBERS 10 connection element; plug-in connector
11 diagnostic module
12 receiving interface
13 data processing module
14 memory module
15 read-out interface
20 first unit
40 read-out device
50 cable; data line
60 cable; voltage supply line
70 wireless connection
110 connection element; intermediate unit
111 diagnostic module
120 first unit
130 second unit
140 read-out device 150 cable; data line
160 cable; voltage supply line
170 wireless connection
210 step
220 step
230 step
240 step

What is claimed is:

1. A system, comprising:
a connection element for producing a wired connection between a first unit and a second unit, the connection element comprising
a diagnostic module, wherein the diagnostic module comprises:
  a receiving interface configured to receive data from the first unit over a wired data connection;
  a memory module configured to store the data received from the first unit for a run time of the first unit; and
  a read-out interface configured to output the data stored by the memory module over a wireless data connection in response to a fault condition of the first unit, in which the first unit cannot communicate over wired routes or is not connected to a voltage supply.

2. The system according to claim 1, wherein
the connection element is configured to produce one or both of a data connection and a connection for transmission of electrical power between the first unit and the second unit.

3. The system according to claim 1, wherein
the data received from the first unit comprises one or both of operating data and diagnostic data; or
the data received from the first unit comprises configuration data for the first unit.

4. The system according to claim 1, wherein the connection element comprises an electrical plug-in connector.

5. The system according to claim 4, wherein the diagnostic module is comprised by the electrical plug-in connector.

6. The system according to claim 1, further comprising the first unit, and wherein the connection element is directly connected to the first unit.

7. The system according to claim 6, wherein the connection element is permanently connected to the first unit.

8. The system according to claim 6, further comprising the second unit.

9. The system according to claim 3, wherein the connection element is configured to transmit the configuration data to the first unit or a first replacement device in response to a recovery signal.

10. The system according to claim 3, wherein
the data received from the first unit comprises one or both of operating data and diagnostic data; and
the data received from the first unit comprises configuration data for the first unit.

11. A method for producing a wired connection between a first unit and a second unit using a connection element with a diagnostic module, the method comprising:

receiving data, by the diagnostic module, from the first unit over a wired data connection;
storing at the diagnostic module the data received from the first unit for a run time of the first unit;
keeping the stored data ready so that it can be read out over a wireless data connection; and
in response to a fault condition of the first unit, in which the first unit cannot communicate over wired routes or is not connected to a voltage supply, outputting at least a portion of the stored data via a read-out interface of the diagnostic module.

12. The method according to claim 11, wherein receiving data includes receiving one or both of operating data and diagnostic data.

13. The method according to claim 12, wherein
receiving data further includes receiving configuration data for the first unit.

14. The method according to claim 13, further comprising:
receiving a recovery signal; and
transmitting the configuration data to the first unit or a first replacement device in response to the recovery signal.

15. The method according to claim 11, wherein the connection element comprises an electrical plug-in connector.

16. A method for outputting device parameters of a connection element comprising a diagnostic module, wherein the diagnostic module includes
  a receiving interface configured to receive data from a first unit over a wired data connection,
  a memory module configured to store the data received from the first unit, and
  a read-out interface configured to output the data stored by the memory module over a wireless data connection,
the method comprising:
storing data in the memory module for a run time of the first unit; and
in response to a fault condition of the first unit, in which the first unit cannot communicate over wired routes or is not connected to a voltage supply, outputting the data from the memory module via the read-out interface of the connection element.

17. The method according to claim 16, wherein storing data in the memory module comprises storing one or both of operating data and diagnostic data.

18. The method according to claim 17, wherein storing data in the memory module further comprises storing configuration data for the first unit.

19. The method according to claim 18, further comprising:
receiving a recovery signal; and
transmitting the configuration data to the first unit or a first replacement device in response to the recovery signal.

20. The method according to claim 16, wherein the connection element comprises an electrical plug-in connector.

* * * * *